US009232510B2

United States Patent
Mudulodu et al.

(10) Patent No.: US 9,232,510 B2
(45) Date of Patent: *Jan. 5, 2016

(54) SELECTING UPLINK SOUNDING SUB-CARRIERS

(71) Applicant: Broadcom Corporation, Irvine, CA (US)

(72) Inventors: Sriram Mudulodu, Santa Clara, CA (US); Djordje Tujkovic, Santa Clara, CA (US); Arogyaswami Paulraj, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/324,798

(22) Filed: Jul. 7, 2014

(65) Prior Publication Data

US 2014/0321390 A1    Oct. 30, 2014

Related U.S. Application Data

(63) Continuation of application No. 12/079,302, filed on Mar. 26, 2008, now Pat. No. 8,774,103.

(51) Int. Cl.
| | |
|---|---|
| *H04W 4/00* | (2009.01) |
| *H04W 72/04* | (2009.01) |
| *H04W 8/30* | (2009.01) |
| *H04J 3/16* | (2006.01) |

(52) U.S. Cl.
CPC .......... *H04W 72/0413* (2013.01); *H04W 8/30* (2013.01)

(58) Field of Classification Search
None
See application file for complete search history.

(56) References Cited

U.S. PATENT DOCUMENTS

| | | | |
|---|---|---|---|
| 2006/0035643 A1* | 2/2006 | Vook et al. | ..... 455/450 |
| 2007/0147533 A1 | 6/2007 | Thomas et al. | |
| 2007/0248147 A1 | 10/2007 | Tiirola et al. | |
| 2007/0275727 A1 | 11/2007 | Lee et al. | |
| 2008/0019279 A1 | 1/2008 | Kim et al. | |
| 2009/0016312 A1 | 1/2009 | Tao et al. | |
| 2009/0122777 A1* | 5/2009 | Tao et al. | ..... 370/343 |
| 2009/0316811 A1 | 12/2009 | Maeda et al. | |
| 2010/0322160 A1 | 12/2010 | Yeh et al. | |

\* cited by examiner

*Primary Examiner* — Eunsook Choi
(74) *Attorney, Agent, or Firm* — Sterne, Kessler, Goldstein & Fox PLLC (57) ABSTRACT

A method and apparatus of selecting a number of uplink sounding sub-carriers are disclosed. One method includes estimating an uplink channel of between a base station and a subscriber. A time domain channel response is determined from the estimated uplink channel. A sub-carrier distribution of uplink sounding sub-carriers is selected based on characteristics of the time domain channel response, wherein the distribution defines a spacing of pilot sub-carriers within the uplink sounding symbol. The subscriber transmits uplink sounding symbols having the selected sub-carrier distribution.

21 Claims, 7 Drawing Sheets

SELECTING UPLINK SOUNDING SUB-CARRIERS

CROSS-REFERENCE TO RELATED APPLICATIONS

This patent is a continuation application of U.S. patent application Ser. No. 12/079,302, filed Mar. 26, 2008, which is incorporated by reference in its entirety.

BACKGROUND OF THE INVENTION

1. Field of the Invention

The described embodiments relate generally to wireless communications. More particularly, the described embodiments relate to a method and system for selecting uplink sounding sub-carriers.

2. Background Art

Mobile WiMAX is a wireless platform being developed to provide wireless access that is able to deliver on demanding service requirements. With the added support for a variety of advanced multi-antenna implementations, Mobile WiMAX offers wireless access that meets growing network demands with higher performance, fewer sites, less spectrum, and reduced cost.

Multiple antenna techniques at the base station and end-user device, paired with sophisticated signal processing, can dramatically improve the communications link for the most demanding application scenarios including heavily obstructed propagation environments and high speed mobility service. Where conventional wireless network design has long used base site sectorization and single, omni-directional antennas at the end-user device to serve the communications link, with advanced multi-antenna implementations operators have a new techniques to develop the robust wireless networks.

Industry vendors and sources have created a host of naming conventions to refer to multi-antenna implementations. Simply put, the term MIMO (multiple input multiple output) can be used to reference any multi-antenna technologies. MIMO antenna systems are used in code division multiple access (CDMA) networks, time division multiplexing (TDM) networks, time division multiple access (TDMA) networks, orthogonal frequency division multiplexing (OFDM) networks, orthogonal frequency division multiple access (OFDMA) networks, and others. In order to maximize throughput, MIMO networks use a variety of channel estimation techniques to measure the transmission channel between a base stations of the wireless network and a mobile device. The channel estimation technique used depends on the wireless network type (i.e., CDMA, TDM/TDMA, OFDM/OFDMA).

Some methods of estimating the transmission channels rely on pilots that occupy valuable time and frequency transmission space. That is, the typical methods require dedicated signaling overhead which that requires bandwidth (time and/or frequency), and therefore, reduces system capacity.

Additionally, wireless networks that include mobile terminals (subscribers) have transmission channels that change frequently. Therefore, the transmission channels must be re-estimated or updated more frequently. As a result, wireless networks that include mobile terminals require even more capacity to be dedicated to channel estimations.

It is desirable to have a system and method for estimating and/or updating transmission channel information between a base station and a mobile terminal of a wireless network that reduces the amount of time and frequency channel capacity required for the uplink sounding pilots.

BRIEF SUMMARY OF THE INVENTION

An embodiment includes a method of selecting a number of uplink sounding sub-carriers. The method includes estimating an uplink channel of between a base station and a subscriber. A time domain channel response is determined from the estimated uplink channel. A sub-carrier distribution of uplink sounding sub-carriers is selected based on characteristics of the time domain channel response, wherein the distribution defines a spacing of pilot sub-carriers within the uplink sounding symbol. The subscriber transmits uplink sounding symbols having the selected sub-carrier distribution.

Another embodiment includes a method of selecting a number of uplink sounding sub-carriers. The method includes estimating an uplink channel of between a base station and a subscriber. A time domain channel response is determined from the estimated uplink channel. A number of uplink sounding sub-carriers are selected based on characteristics of the time domain channel response.

Another embodiment includes method of selecting a number of uplink sounding sub-carriers. The method includes a subscriber transmitting a predetermined number of uplink sounding sub-carriers within at least one multi-carrier symbol through an uplink channel. A base station estimating an uplink channel of the subscriber based on the received predetermined number of uplink sounding sub-carriers. The base station determines a time domain channel response from the estimated uplink channel, and the base station selects a number of uplink sounding sub-carriers based on characteristics of the time domain channel response.

Other aspects and advantages of the present invention will become apparent from the following detailed description, taken in conjunction with the accompanying drawings, illustrating by way of example the principles of the invention.

DETAILED DESCRIPTION OF THE INVENTION

Methods and apparatuses for selecting a distribution and/or number of uplink sounding sub-carriers are disclosed. The methods and apparatuses generally include computing a channel impulse response of a transmission channel. A distribution uplink sounding sub-carriers of a multi-carrier symbol can be selected based on the channel impulse response. Based on the selected distribution, a number of pilot sub-carriers within the multi-carrier symbol can be selected. Alternatively, the number of pilot sub-carrier within the multi-carrier symbol can be selected.

Figure 1:
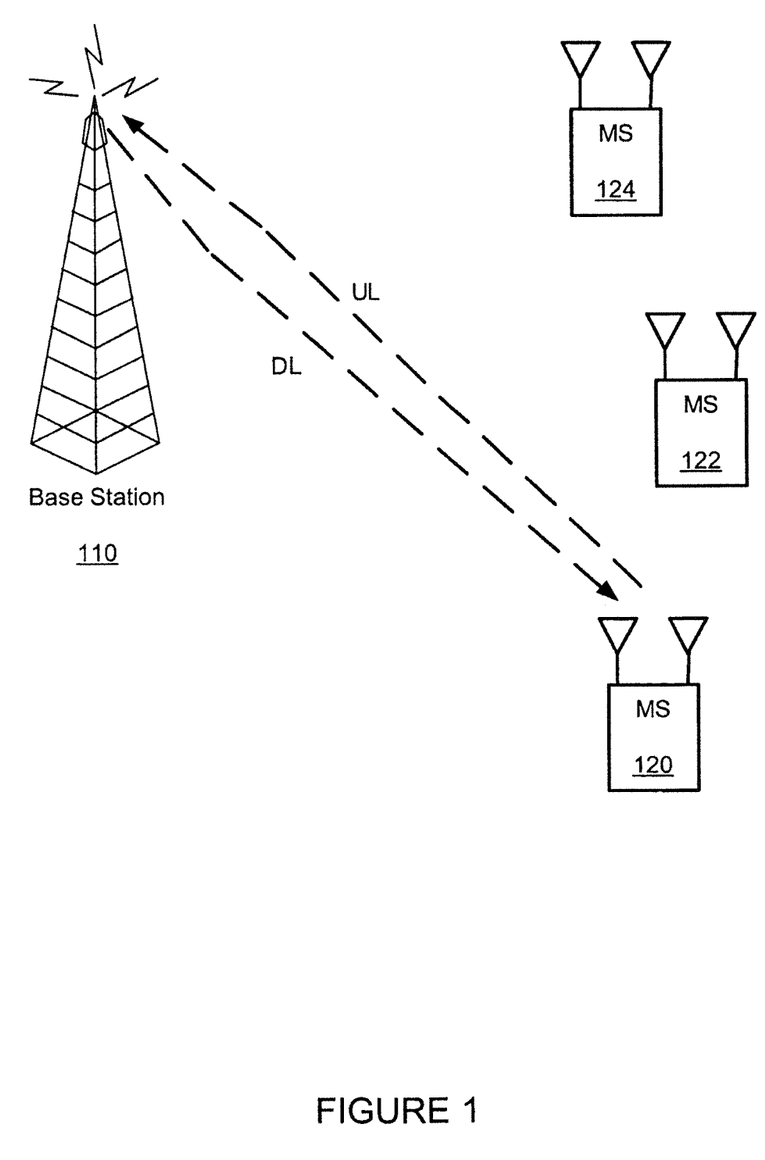
FIG. 1 shows an example of a base station (BS) and mobile station (MS), and corresponding downlink (DL) and uplink (UL).

FIG. 1 shows an example of a base station and mobile station, and corresponding downlink and uplink. The base station 110 and user devices 120, 122, 124 can be a part of a wireless network, for example, a WiMax wireless network. To capitalize on the performance advantages offered by MIMO wireless systems, the wireless network can include MIMO communication diversity, MIMO spatial multiplexing and/or beamforming.

Wireless network systems, such as, WiMA.X systems, can also use beamforming as a means to further increase system coverage and capacity can surpass the capabilities of MIMO techniques. Beamforming techniques such as Statistical Eigen Beamforming (EBF) and Maximum Ratio Transmission (MRT) are optional features in the 802.16e WiMAX standard, but some vendors are taking advantage of its strong performance characteristics.

Beamforming techniques leverage arrays of transmit and receive antennas to control the directionality and shape of the radiation pattern. The antenna elements have spatial separation dictated by the wavelength of transmission and are supported by signal processing.

Channel information can be communicated from the WiMAX subscriber to the WiMAX base station using the uplink sounding response. Based on the understanding of the channel characteristics, the WiMAX base station utilizes signal processing techniques to calculate weights to be assigned to each transmitter controlling the phase and relative amplitude of the signals. By leveraging constructive and destructive interference, the radiation pattern is steered and formed to provide an optimal radiation pattern focused in the direction of communication.

When transmitting a signal, beamforming can increase the power in the direction the signal is to be sent. When receiving a signal, beamforming can increase the receiver sensitivity in the direction of the wanted signals and decrease the sensitivity in the direction of interference and noise.

Beamforming techniques allow the WiMAX system to realize increased range with higher antenna gain in the desired direction of communications and better connectivity between the base station and device. Simultaneously, the narrower beamwidth and reduced interference increases the capacity and throughput offered by the system.

Estimated transmission channel information is needed for proper selection between beamforming and/or spatial multiplexing transmission. As previously described, the channel information for mobile networks changes more rapidly than for static networks, and therefore, the channel information needs to be updated more frequently.

MIMO communication diversity includes a single data stream being replicated and transmitted over multiple antennas. For example, the redundant data streams can each be encoded using a mathematical algorithm known as Space Time Block Codes. With this example of coding, each transmitted signal is orthogonal to the rest reducing self-interference and improving the capability of the receiver to distinguish between the multiple signals.

MIMO spatial multiplexing includes the signal to be transmitted being split into multiple data streams and each data stream is transmitted from a different base station transmit antenna operating in the same time-frequency resource allocated for the receiver. In a multipath environment, the multiple signals will arrive at the receiver antenna array with sufficiently different spatial signatures allowing the receiver to readily discern the multiple data streams. Spatial multiplexing provides a capable means for increasing the channel capacity.

Figure 2:
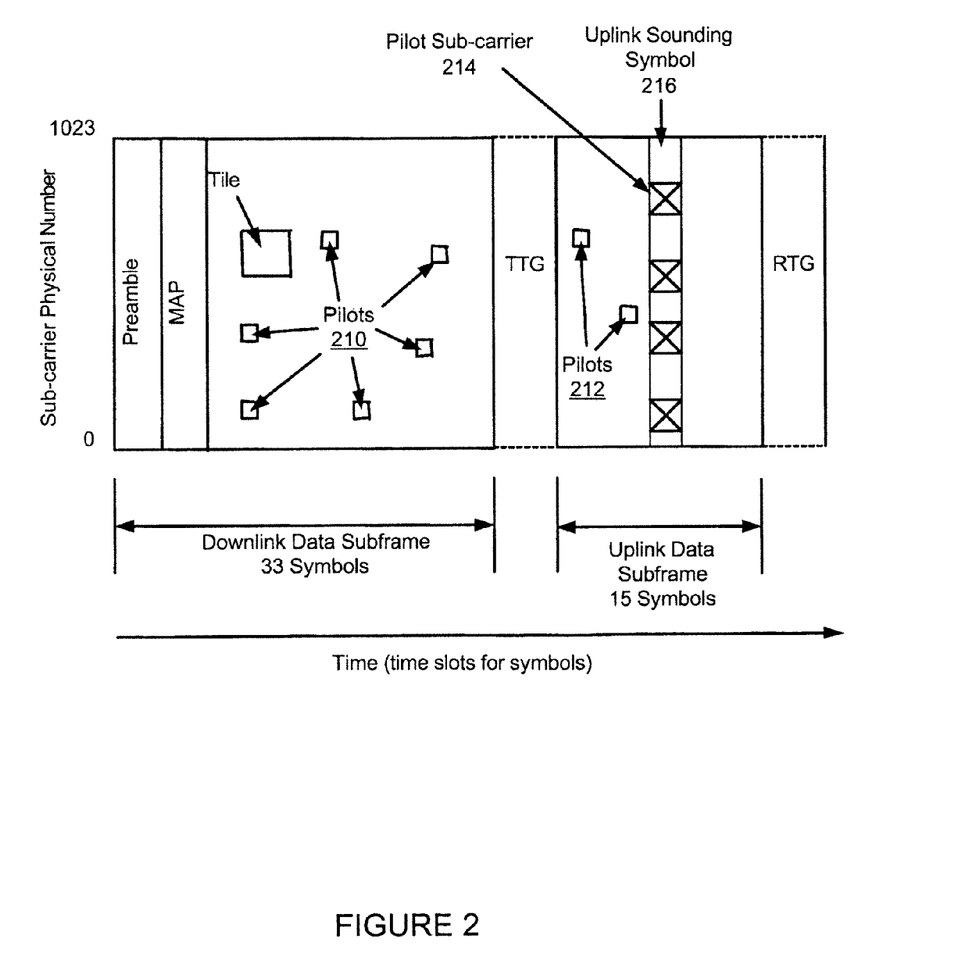
FIG. 2 shows an example of downlink and uplink frame that can be used for scheduled wireless communications.

FIG. 2 shows an example of downlink and uplink frame that can be used for scheduled wireless communications. The downlink frame and the uplink frame include sub-carriers (1024 sub-carriers are shown in FIG. 2) and time slots for OFDM symbols (33+15=48 symbols are shown in FIG. 2). The downlink frame includes a preamble and a MAP. A particular carrier frequency and a particular symbol can used to identify a tile (frequency and time slot) within the downlink and/or uplink frames.

The uplink frame includes uplink sounding symbols (also referred to as pilot sub-carriers) that can be used to characterize an uplink channel between the mobile terminal and the base station. Guards TTG and RTG are included between the downlink and uplink frames.

The MAP includes a schedule of the downlink and uplink transmission. Based on the MAP, the mobile terminals can identify tile in which data and pilots are located. The MAP includes the previously discussed identifying information.

The downlink can include pilot tones 210 that are used to characterize a downlink channel between a base station and mobile terminal. That is, pilot tones having predetermined characteristics are downlink transmitted from the base station to the subscriber. Based on characteristics of the pilot tones as received by the subscriber, the downlink channel can be estimated.

For a time division duplex (TDD) system, the downlink channel can be estimated by an estimate of the reciprocal uplink channel. The uplink channel can be estimated by either pilot tones in data zone 212 or sounding pilot tones 214 transmitted through the uplink channel between the subscriber and the base station. The sounding pilot tones can be included within an uplink sounding symbol 216.

As will be described, whether the channel estimates are made based on downlink pilots or pilots sub-carriers of uplink sounding symbols, future channel estimates can be made based on uplink sounding symbols in which a distribution and/or number of pilot sub-carriers are selected to be included within the future uplink sounding symbols based on characteristics of the time domain channel response of the initial channel estimates. The selected distribution and/or number of pilot sub-carriers are dependent upon the frequency selectivity of the channel response. As previously described, it is desirable to minimize the number of pilot sub-carriers of the uplink sounding symbols because each pilot sub-carrier occupies valuable time and frequency slots.

Figure 3:
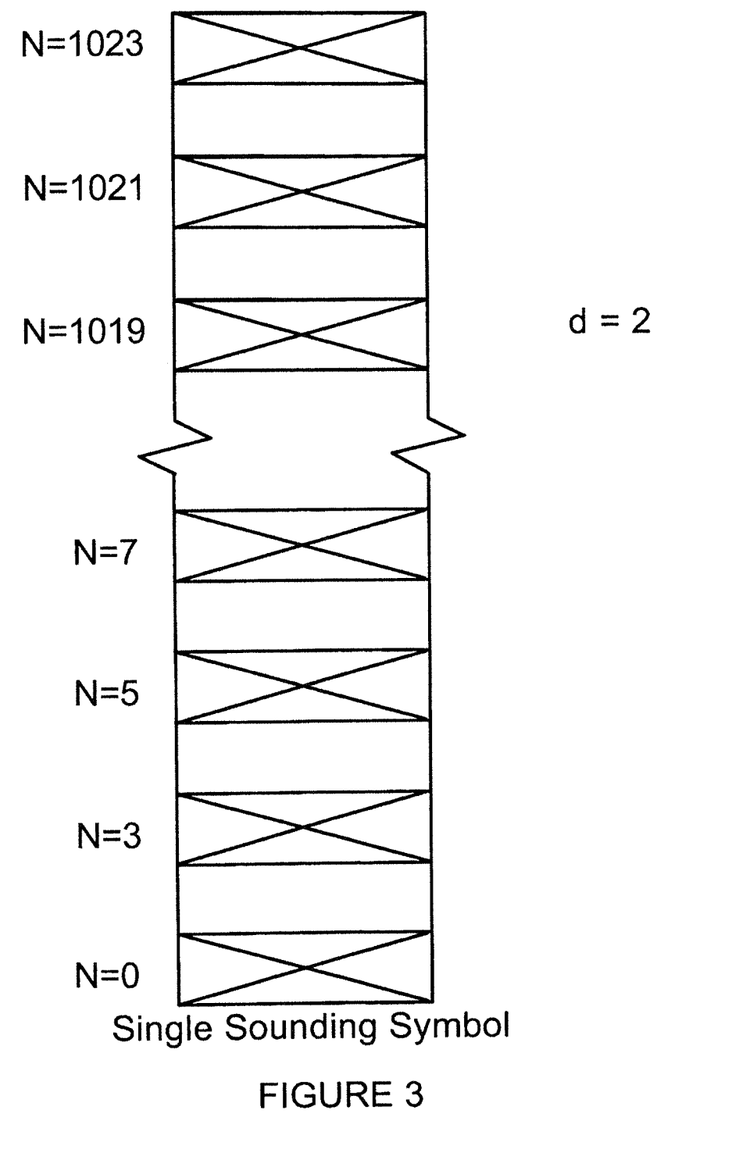
FIG. 3 shows an example of an uplink sounding symbol, and designated uplink sounding sub-carriers.

FIG. 3 shows an example of an uplink sounding symbol, and designated uplink sounding sub-carriers. The single uplink sounding symbol of FIG. 3, includes sounding sub-carriers on every other of 1024 frequency sub-carriers. This corresponds to a distribution of d=2. The total number of uplink sounding sub-carriers is (1024/2) 512. It is to be understood that d=can ideally vary from 1 to N. For the uplink sounding symbol shown in FIG. 3, N=1023.

An embodiment includes designating a first predetermined number and a last predetermined number of uplink (UL) sounding sub-carriers as a guard band which are not populated by pilot sub-carriers. That is, this embodiment includes designating sub-carriers N=0 to N=the first predetermined number as a guard band, and not populating these sub-carriers by pilot sub-carriers. Additionally, the last predetermined number of the 1024 sub-carriers is not populated by pilot sub-carriers. Therefore, sounding does not occur with the guard band as defined by the first and second predetermined numbers. The guard bands reduce the impact of interference from adjacent channels.

As previously described, the distribution or decimation factor d is selected based on the channel impulse response of the transmission channel (uplink) between the mobile subscriber and the base station. As previously described, the uplink sounding sub-carriers occupy valuable time/frequency space. Therefore, it is desirable to minimize the number of frequency sub-carriers occupied by the sounding.

An embodiment includes setting a cap on the number of uplink sounding sub-carriers. If the distribution d is too small, causing the total number of uplink sounding sub-carriers to be too large, the total number can be capped. The distribution d can be maintained for a capped number of uplink sounding sub-carriers by concentrating the uplink sub-carriers to a reduced number of the total available sub-carriers. That is, for example, if d is selected to be 1, and the total number of uplink sounding sub-carriers is capped at 512, the number of uplink sound sub-carriers can be strategically placed over half of the available uplink sounding sub-carriers. An embodiment includes selecting placement of the capped number of uplink sounding sub-carrier where the channel gain is the largest. The sub-carriers that provide the largest channel gain can be identified based on the previous knowledge UL channel and/ or based on a best band selection feedback from mobile terminal.

Figure 4A:
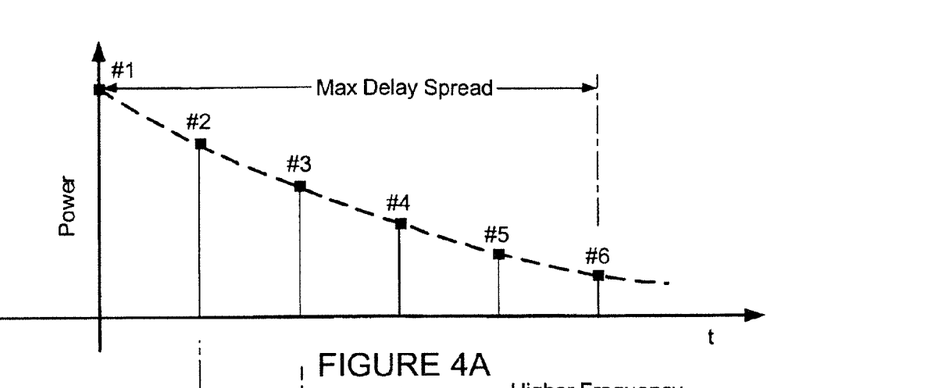
FIGS. 4A, 4B and 4C show examples of channel impulse responses based on estimated transmission channels.
Figure 4B:
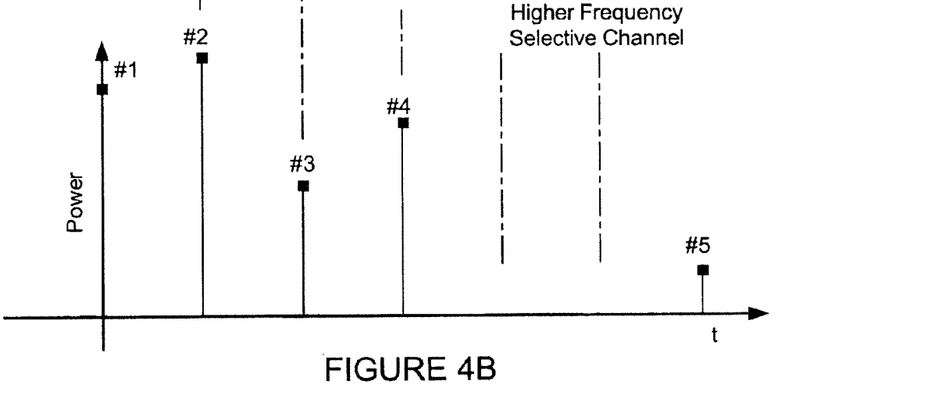
Figure 4C:
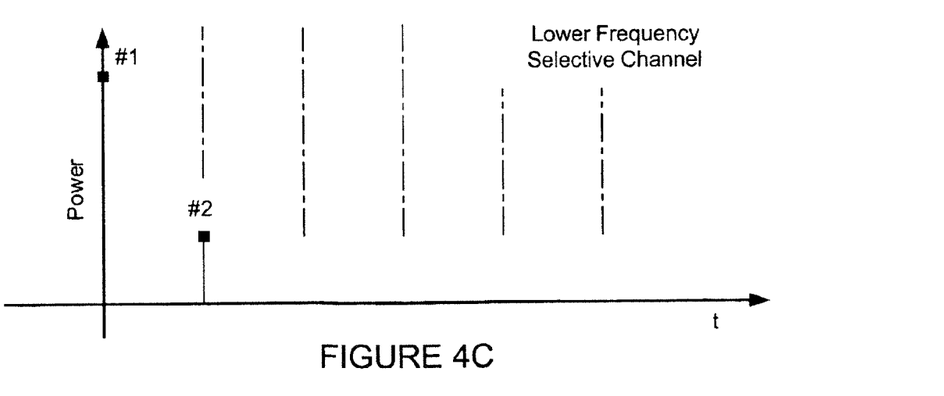

FIGS. 4A, 4B and 4C show examples of the time domain channel responses (also referred to as the channel impulse response) based on estimated transmission channels. Methods of calculating the channel impulse response include, for example, . . . .

The number of delay taps in the exemplary FIGS. 4A, 4B and 4C is 6, 5 and 2, respectively. While the time domain channel response in general includes both amplitude and phase delay profile of channel, the knowledge of power delay profile derived by squaring the per delay tap amplitudes is sufficient for the described embodiments.

FIG. 4A shows a time domain channel response that includes six taps, and a max delay spread calculated by multiplying the number of taps by the sampling time of an FFT block.

FIG. 4B shows a time domain channel response of a channel that has relatively higher frequency selectivity than the than the channel represented by FIG. 4A. As a result, the uplink sounding sub-carriers required for proper channel estimation is denser. That is, the distribution of the uplink sounding sub-carriers is smaller, requiring more uplink sounding sub-carriers per available sub-carrier of the uplink sounding symbol. The time domain channel response includes five taps, and has a greater delay spread than the time domain channel response of FIG. 4A. Also, the second and consecutive taps in power delay profile have relatively higher power compared to FIG. 4A. Therefore the root mean squared (RMS) delay spread of channel in FIG. 4B is larger then channel in FIG. 4A.

FIG. 4C shows a time domain channel response of a channel that has relatively lower frequency selectivity than the than the channel represented by FIG. 4A. As a result, fewer uplink sounding sub-carriers are required due to the flatter frequency response of the estimated channel. This time domain channel response has two taps, and smaller delay spread than the time domain channel response of FIG. 4A.

Figure 5:
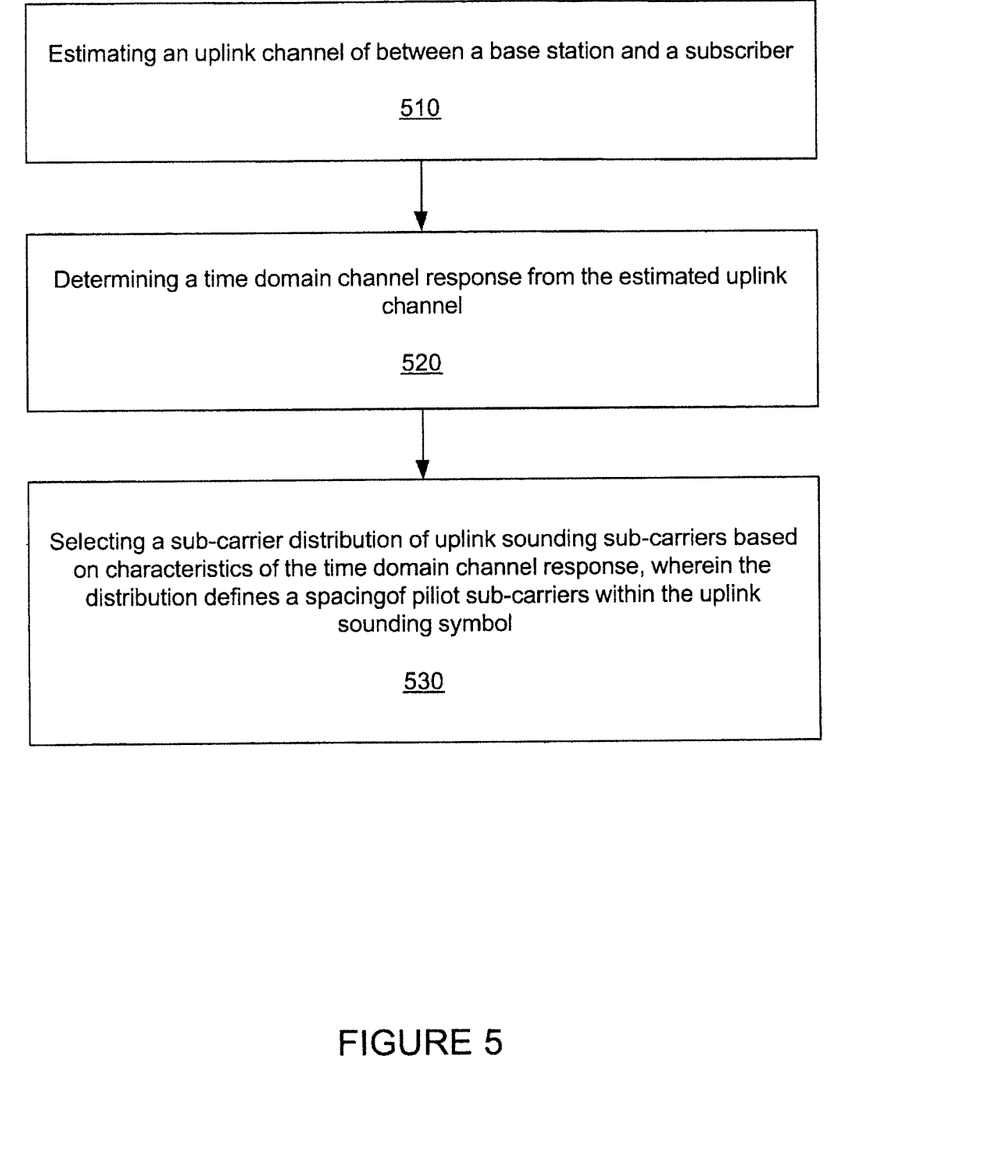
FIG. 5 is a flow chart that includes steps of one example of a method of selecting a number of uplink sounding sub-carriers.

FIG. 5 is a flow chart that includes steps of one example of a method of selecting uplink sounding sub-carriers of a uplink sounding symbol. A first step 510 includes estimating an uplink channel of between a base station and a subscriber. A second step 520 includes determining a time domain channel response from the estimated uplink channel. A third step 530 includes selecting a sub-carrier distribution of uplink sounding sub-carriers within an uplink sounding symbol based on characteristics of the time domain channel response, wherein the distribution defines a spacing of pilot sub-carriers within the uplink sounding symbol.

Once the distribution of the uplink sounding sub-carriers has been selected, the transmission of the uplink sounding sub-carriers can be scheduled. The uplink sounding sub-carriers are scheduled within an uplink frame by, for example, the base station. An embodiment includes the schedule can be included within a MAP generated by the base station, and is based on the selected distribution, and the predetermined number of sub-carriers within the multi-carrier sounding symbol. As will be described, includes the base stations can capping the number of uplink sounding sub-carriers depending on characteristics of the estimated channel.

The time domain channel response can be determined based on a channel estimate. Once the time domain channel response has been determined, the distribution of uplink sounding sub-carriers is selected based on characteristics of the time domain channel response. Characteristics that can be used to select the distribution include, for example, the maximum delay spread of taps of the time domain channel response. Other characteristics include an RMS delay spread of taps of the time domain channel response, or a number taps of the time domain channel response.

While the exact frequency selectivity of the channel can be determined by the FFT or simplified FFT of the whole power delay profile, the RMS delay spread typically provides a reasonably good first order estimate of frequency selectivity with reduced complexity. Other methods like maximum delay spread and/or max number of taps provide further tradeoff between quality of estimated frequency selectivity and the reduced computational complexity.

Another embodiment includes the distribution of uplink sounding sub-carriers is determined from a look up table based on at least one characteristic of the time domain channel response. The look up table can be generated by correlating the preferred distribution of UL sounding sub-carriers to a given characteristic of the channel by simulation and experimentation. A typical metric for tuning tables can be normalized mean square error of the channel estimate on UL sounding symbol as a function of pilot spacing and a given characteristic of the channel.

Another embodiment includes the distribution being calculated based on the time domain channel response and a predetermined minimum correlation threshold between adjacent uplink sounding sub-carriers. For this embodiment, the average frequency domain correlation is calculated on two pilot tones separated by d tones. Since the average frequency domain correlation is inversely proportional to d, the maximum d=d_max which keeps the average frequency domain correlation below predetermined threshold can be identified.

Based on the selected distribution of the uplink sounding sub-carriers, a number of corresponding uplink sounding sub-carriers can be determined based on the distribution and the number of available uplink sounding sub-carriers within each uplink sounding symbols. For example, WiMAX uplink sounding symbols include 1024 multi-carriers. Therefore, the number of uplink sounding sub-carriers can be determined by dividing the 1024 available symbols by the distribution d. For example, if d=2, then the total number of uplink sounding sub-carriers is 512 for a WiMAX uplink sounding symbol.

An embodiment includes capping the number of uplink sounding sub-carriers per symbols. One embodiment includes maintaining the selected distribution, but limiting the range of the sub-carriers of the uplink sounding symbol used for uplink sounding sub-carriers. For example, the range could be limited from 0 to 1023 sub-carriers to 0 to 511 sub-carriers while maintaining the selected distribution. Another embodiment includes setting the distribution to one if calculated number of uplink sounding sub-carriers is greater than a predetermined threshold number of uplink sounding sub-carriers, then setting the distribution to be one.

A channel that has relatively high frequency selectivity typically requires a higher density of uplink sounding sub-carriers than a channel that has relatively low frequency selectivity. Therefore, an embodiment includes the range of frequency sub-carriers being dependent on a frequency selectivity of the channel impulse response.

An embodiment includes selecting concentrations of uplink sounding sub-carriers where the channel gain is the largest. For an embodiment, this includes selecting the preferred allocation for such uplink sounding sub-carrier concentration subject to capping based on the previous knowledge of the UL channel and/or based on a best band selection feedback from SS.

Embodiments include the selected number of uplink sounding sub-carriers being adaptively updated based on continual determinations of the time domain channel response. Embodiments include the time domain channel response being determined instantaneously, or the time domain channel response is averaged over time. The average power delay profile of the time domain channel response typically provides enhanced robustness by allowing optimization of the preferred distribution in time varying channels.

An embodiment includes the updating of the selected number of uplink sounding sub-carriers being triggered upon detection of particular characteristics of the time domain channel response. The update can be triggered, for example, by detection of greater than a threshold of change of at least one of maximum delay spread of the time domain channel response, RMS delay spread of the time domain channel response, number of taps of the time domain channel response. While the exact frequency selectivity of the channel can be determined by the FFT or simplified FFT of the whole power delay profile, the RMS delay spread typically provides a reasonably good first order estimate of frequency selectivity with reduced complexity. Other methods like maximum delay spread and/or max number of taps provide further tradeoff between quality of estimated frequency selectivity and the reduced computational complexity.

Alternatively or additionally, the update can be triggered, for example, by detection of greater than a threshold of change of correlation between uplink sounding sub-carriers.

An embodiment additionally includes the base station estimating uplink channels for a plurality of subscribers. The base station determines a time domain channel response for each of the subscribers based on the estimated uplink channels. The base station selecting a distribution of uplink sounding sub-carrier for each subscriber based on characteristics of the time domain channel response of each of the subscribers.

Figure 6:
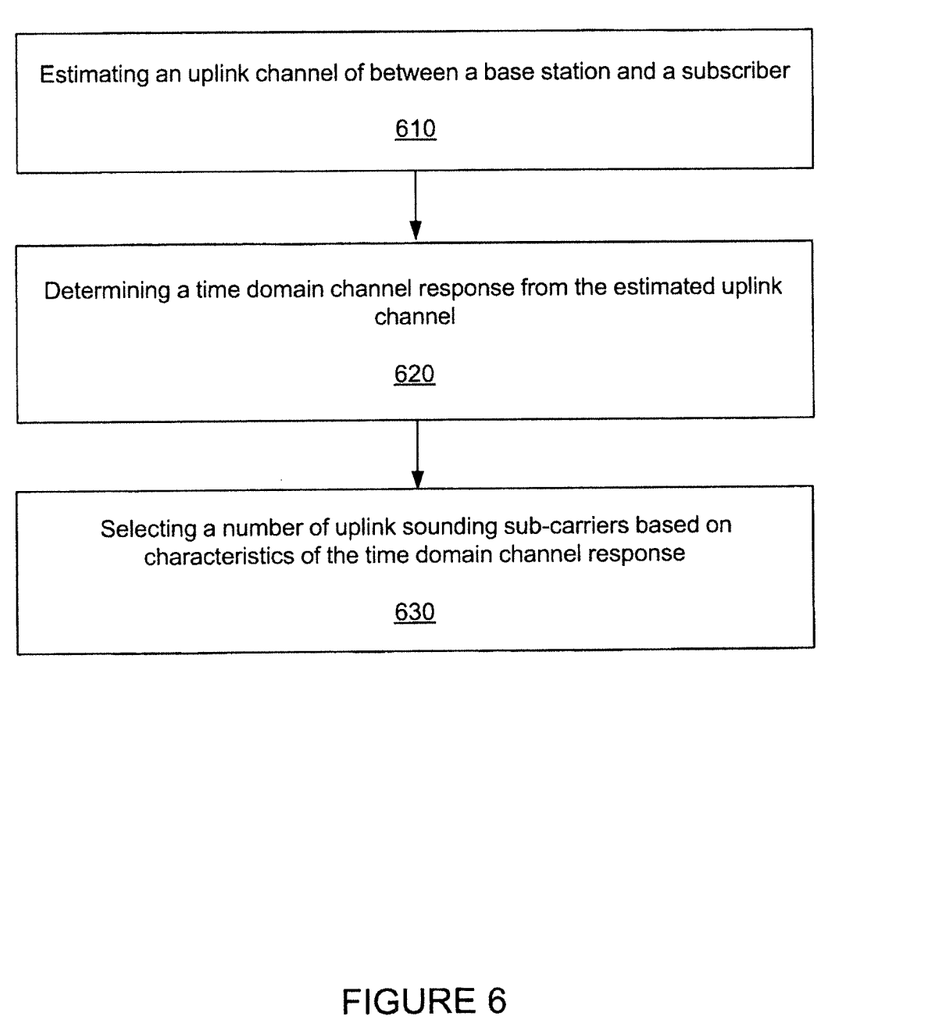
FIG. 6 is a flow chart that includes steps of one other example of a method of selecting a number of uplink sounding sub-carriers.

FIG. 6 is a flow chart that includes steps of one other example of a method of selecting a number of uplink sounding sub-carriers. A first step 610 includes estimating an uplink channel of between a base station and a subscriber. A second step 620 includes determining a time domain channel response from the estimated uplink channel. A third step 630 includes selecting a number of uplink sounding sub-carriers based on characteristics of the time domain channel response.

An embodiment additionally includes the base station estimating uplink channels for a plurality of subscribers. The base station determines a time domain channel response for each of the subscribers based on the estimated uplink channels. The base station selecting a number of uplink sounding sub-carrier for each subscriber based on characteristics of the time domain channel response of each of the subscribers.

Figure 7:
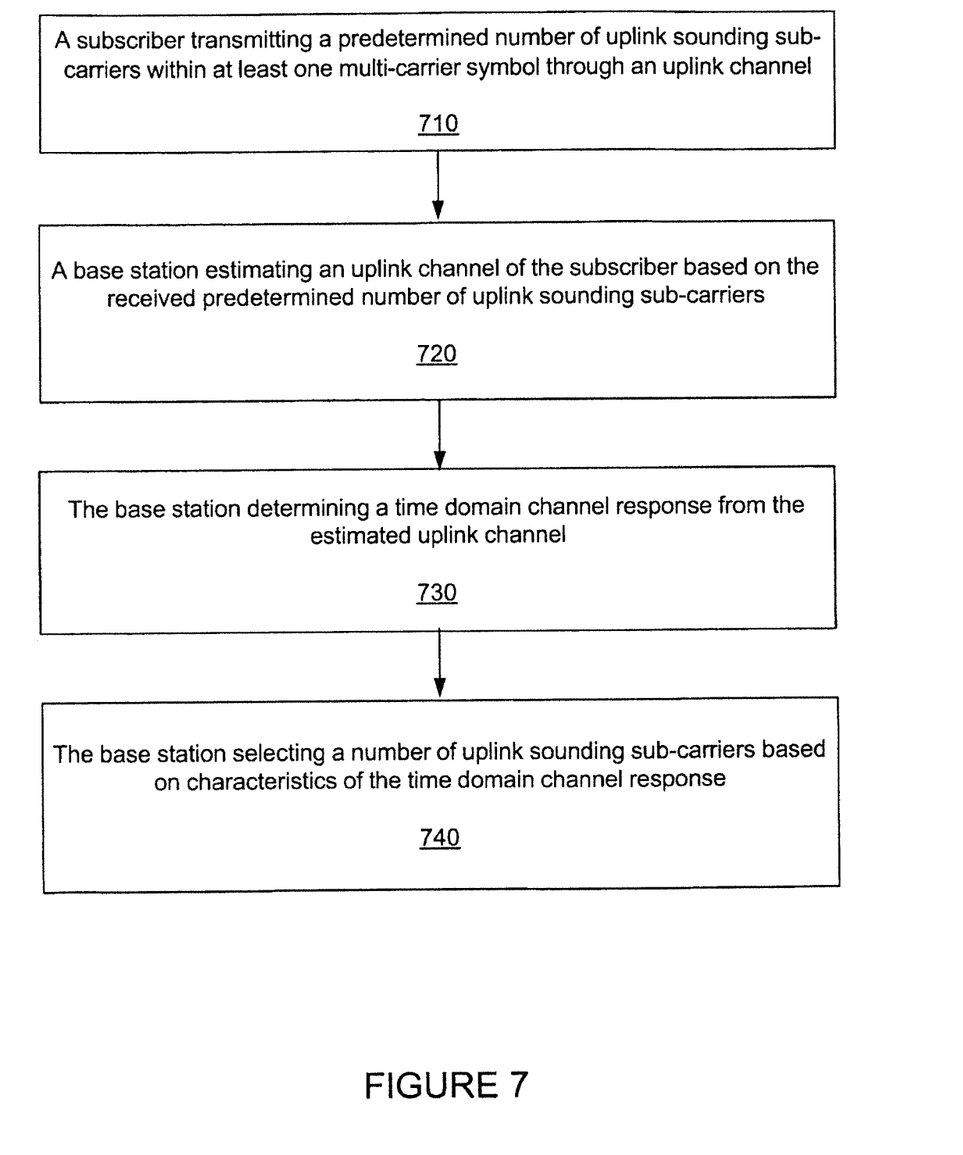
FIG. 7 is a flow chart that includes steps of one other example of a method of selecting a number of uplink sounding sub-carriers.

FIG. 7 is a flow chart that includes steps of one other example of a method of selecting a number of uplink sounding sub-carriers. A first step 710 includes a subscriber transmitting a predetermined number of uplink sounding sub-carriers within at least one multi-carrier symbol through an uplink channel and/or via data allocation in UL subframe. A second step 720 includes a base station estimating an uplink channel of the subscriber based on the received predetermined number of uplink sounding sub-carriers and/or based on pilots in UL data zone. A third step 730 includes the base station determining a time domain channel response from the estimated uplink channel. A fourth step 740 includes the base station selecting a number of uplink sounding sub-carriers based on characteristics of the time domain channel response.

Embodiment include the number of uplink sounding sub-carriers being based on maximum delay spread of taps of the time domain channel response, or a number taps of the time domain channel response.

An embodiment includes the base station estimating uplink channels for a plurality of subscribers. The base station determines a time domain channel response for each of the subscribers based on the estimated uplink channels. Further, the base station selects a number of uplink sounding sub-carrier for each subscriber based on characteristics of the time domain channel response of each of the subscribers.

Although specific embodiments of the invention have been described and illustrated, the invention is not to be limited to the specific forms or arrangements of parts so described and illustrated. The invention is limited only by the appended claims.

What is claimed is:

1. A method of distributing uplink sounding sub-carriers in an uplink sounding symbol, comprising:
   estimating an uplink channel between a subscriber and a base station;
   determining a time domain channel response from the estimated uplink channel;
   determining a frequency selectivity of the estimated uplink channel from the time domain channel response; and
   selecting a density of uplink sounding sub-carriers within the uplink sounding symbol based on the frequency selectivity of the estimated uplink channel,
   wherein the base station receives the uplink sounding symbol having the selected uplink sounding sub-carrier density.

2. The method of claim 1, wherein the uplink sounding symbol occupies a single time slot within an uplink frame.

3. The method of claim 1, wherein a maximum delay spread of taps of the time domain channel response is indicative of the frequency selectivity of the estimated uplink channel.

4. The method of claim 1, wherein the density of uplink sounding sub-carriers is selected from a look up table based on the frequency selectivity.

5. The method of claim 1, further comprising defining a guard band of sub-carriers in the uplink sounding symbol that are not to be populated with the uplink sounding sub-carriers.

6. The method of claim 5, wherein the guard band includes a first predetermined number of sub-carriers in the uplink sounding symbol and a last predetermined number of sub-carriers in the uplink sounding symbol.

7. The method of claim 1, wherein the density is selected to be relatively high for a high frequency selectivity, and
wherein the density is selected to be relatively low for a low frequency selectivity.

8. A method of distributing uplink sounding sub-carriers in an uplink sounding symbol, comprising:
estimating an uplink channel between a subscriber and a base station;
determining a frequency domain channel gain from the estimated uplink channel; and
selecting a concentration of the uplink sounding sub-carriers within the uplink sounding symbol based on the frequency domain channel gain,
wherein the base station receives the uplink sounding symbol having the selected concentration of uplink sounding sub-carriers.

9. The method of claim 8, wherein the selected concentration defines a separation between consecutive uplink sounding sub-carriers within the uplink sounding symbol.

10. The method of claim 9, wherein the separation defined by the selected concentration varies throughout the uplink sounding symbol.

11. The method of claim 8, wherein the selected concentration is selected to be relatively higher near locations in the uplink sounding symbol having a high frequency domain channel gain, and
wherein the concentration is selected to be relatively lower near locations in the uplink sounding symbol having a low frequency domain channel gain.

12. The method of claim 8, wherein the selected concentration is selected based on previous knowledge of the uplink channel.

13. The method of claim 8, wherein the selected concentration is selected based on a best band selection feedback from the subscriber.

14. The method of claim 8, wherein the selected concentration defines at least one range of sub-carriers within the uplink sounding symbol to include the uplink sounding sub-carriers.

15. A method of distributing uplink sounding sub-carriers in an uplink sounding symbol, comprising:
estimating an uplink channel between a subscriber and a base station;
determining a time domain channel response from the estimated uplink channel;
selecting a density of uplink sounding sub-carriers within the uplink sounding symbol based on the time domain channel response of the estimated uplink channel; and
setting a cap on a number of uplink sounding sub-carriers based on the selected density,
wherein the base station receives the uplink sounding symbol having the selected uplink sounding sub-carrier density.

16. The method of claim 15, wherein the cap limits the selected density to a predetermined range of sub-carriers of an uplink subframe.

17. The method of claim 16, further comprising:
determining a frequency domain channel gain of the estimated uplink channel based on the time domain channel response; and
setting the predetermined range based on the determined frequency domain channel gain.

18. The method of claim 17, wherein the predetermined range is set to include a sub-carrier having a frequency that has a highest channel gain.

19. The method of claim 17, wherein the frequency domain channel gain is determined based on previous knowledge of the uplink channel or based on a best band selection feedback from the subscriber.

20. The method of claim 15, wherein the selected density defines a number of uplink sounding sub-carriers to be placed in the uplink sounding symbol, and
wherein the cap defines a predetermined sub-range of sub-carriers of an uplink subframe to include the number of uplink sounding sub-carriers, the number being limited by the size of the predetermined sub-range.

21. A method of distributing uplink sounding sub-carriers in an uplink sounding symbol, comprising:
estimating an uplink channel between a subscriber and a base station;
determining a time domain channel response from the estimated uplink channel;
determining a frequency selectivity of the estimated uplink channel from the time domain channel response; and
selecting a density of uplink sounding sub-carriers within the uplink sounding symbol based on the frequency selectivity of the estimated uplink channel,
sending the selected density of uplink sounding sub-carriers to the subscriber.

* * * * *